Feb. 28, 1961   C. J. HOLM   2,972,855
DEVICE FOR WINDING LINE

Filed Aug. 28, 1958   3 Sheets-Sheet 3

United States Patent Office 2,972,855
Patented Feb. 28, 1961

2,972,855
DEVICE FOR WINDING LINE
Carl Julianus Holm, Lerkendalsveien 19, Trondheim, Norway
Filed Aug. 28, 1958, Ser. No. 757,844
Claims priority, application Norway Oct. 4, 1957
1 Claim. (Cl. 57—66.5)

This invention relates to devices for the winding of line on spools and the like.

The term "line" as employed in this application is intended to include ropes made of steel wire, filaments, nylon and so forth and is, in general, intended to include any flexible elongated body of cylindrical, oval and like cross-section.

It is an object of the invention to provide improved means for laying line on a spool or bobbin or the like in that type of apparatus in which the spool or like mechanism normally rotates during operation about an axis which is normal to its own axis.

It is a further object of the invention to provide an improved guiding means in adjacent coils on a spool or the like.

Briefly, to achieve the above and other of its objectives, the invention contemplates the positioning of a spool or the like on a rotatable frame in which is further journalled a cam or like device which controls an arm susceptible of being oscillated in opposite direction despite the rotation of the frame and for purposes of sweeping back and forth across the spool.

The invention will be more readily understood from the following detailed description of a preferred embodiment as illustrated in the accompanying drawing in which.

Figure 1:
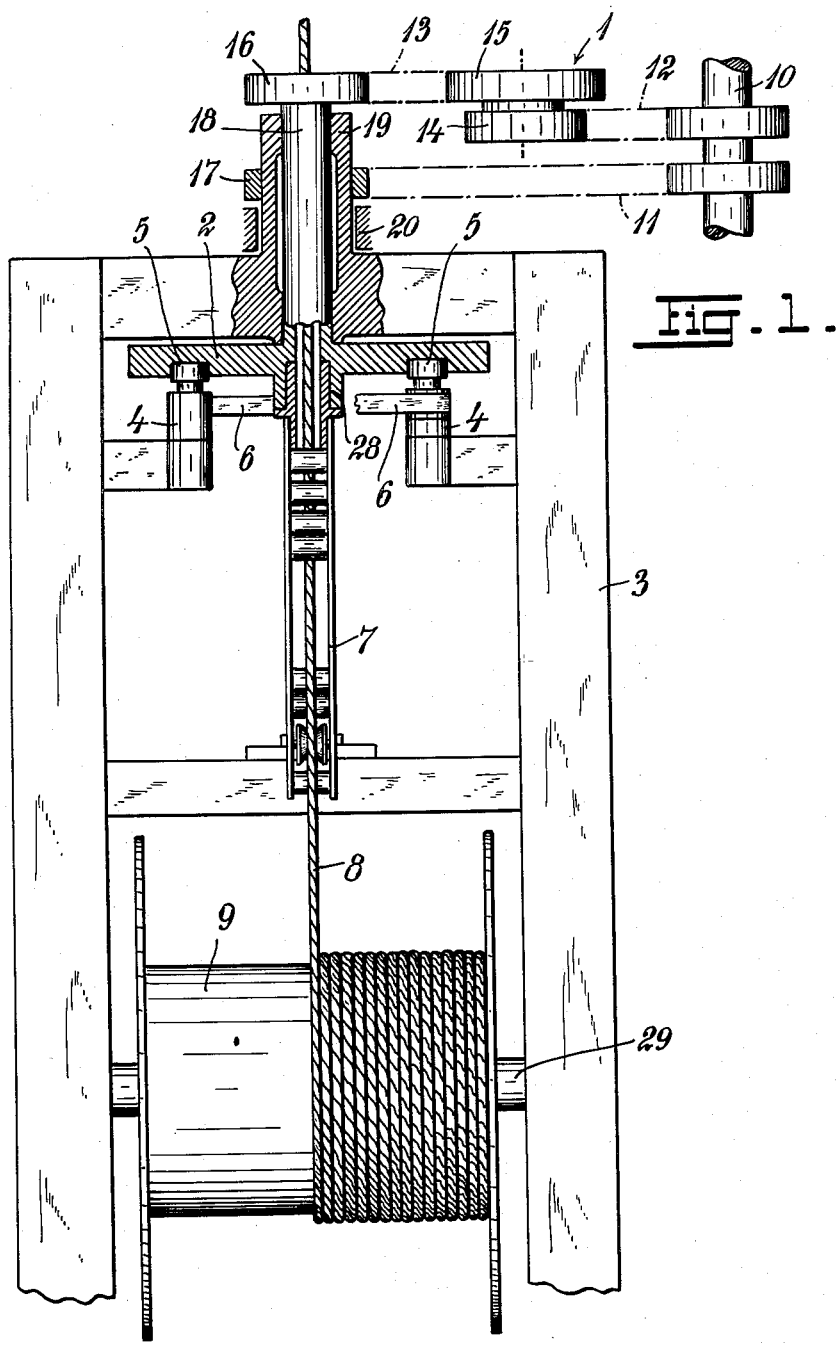
Fig. 1 is a front view of a structure provided in accordance with the invention, the view being partially in section.
Figure 2:
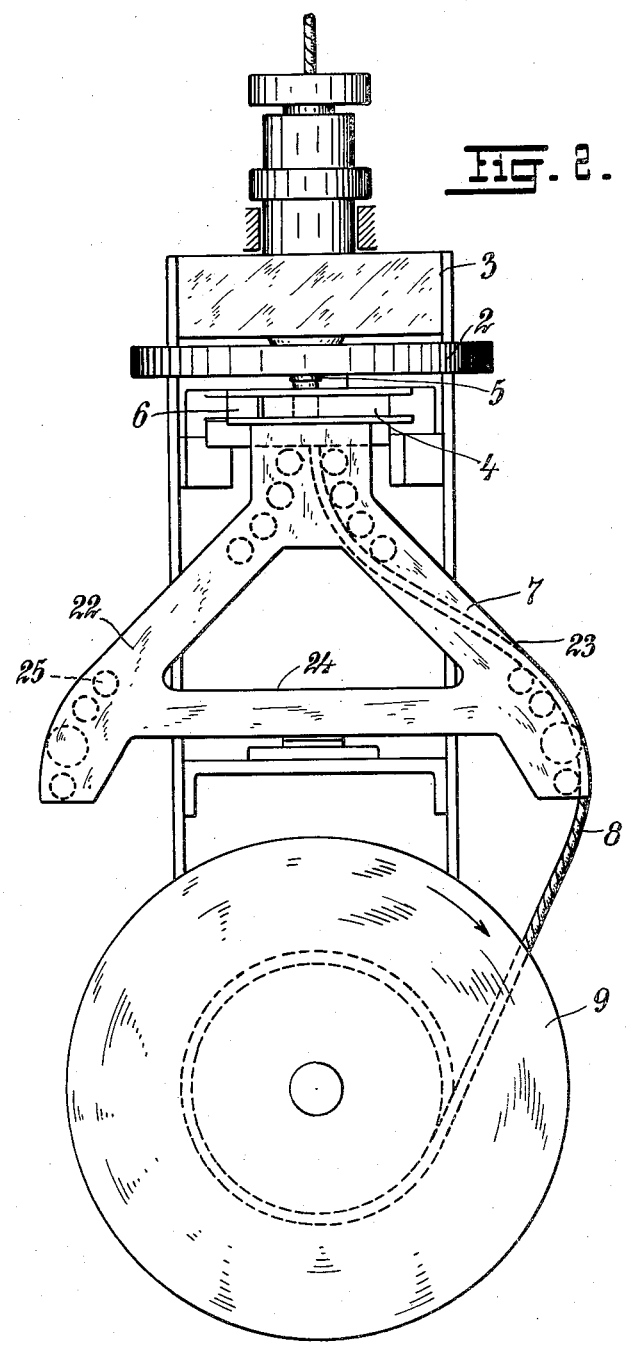
Fig. 2 is a side view, partially in section, of the structure illustrated in Fig. 1.
Figure 3:
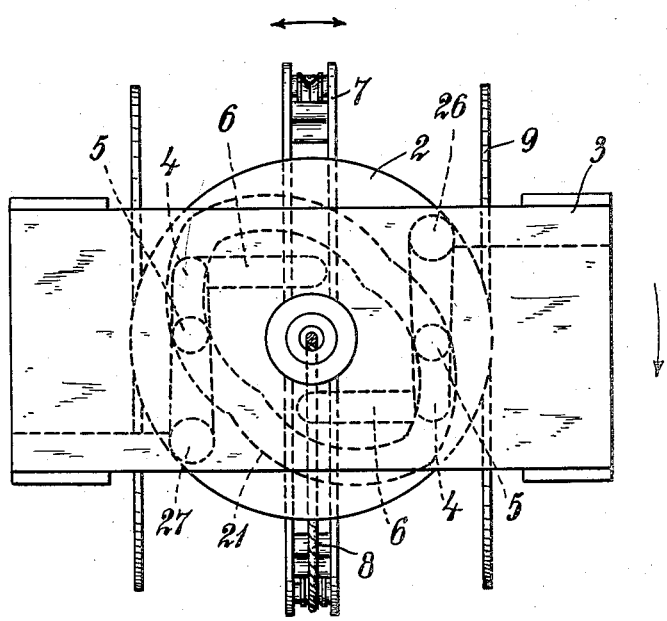
Fig. 3 is a top view of the structure illustrated in Figs. 1 and 2.

In the drawing there is diagrammatically illustrated a pulley arrangement 1 intended to transmit two speeds of rotation to the structure, which is next to be described.

The structure includes a cam means 2 rotatably journalled on a rotatable frame 3 on which are pivotably mounted two arms 4.

The structure further includes cam followers or rollers 5 which are controlled by the cam means 2 and which, in turn, control the movements of arms 6 which are rigidly fixed to a line guiding device 7 which guides the laying of a line 8 on a spool or bobbin 9.

The pulley arrangement 1 is any transmission device susceptible of being driven by a rotary source of power 10 which operates through belts 11, 12 and 13 (diagrammatically illustrated) and by means of an intermediate set of gears or pulleys 14 and 15 to drive pulleys 16 and 17 at two different rates of rotation.

Pulley 16 is rigidly connected with cam means 2 by the intermediary of a hollow shaft 18. Frame 3 is coupled with pulley 17 and driven thereby through the intermediary of a shaft 19, journalled in bushing 20, the shaft 19 being hollow to concentrically accommodate the shaft 18.

From the above arrangement, it will be appreciated that the frame 3 can rotate at one angular velocity while the cam 2 rotates at a second angular velocity.

The cam means 2 is, as illustrated, preferably a disc having therein a groove 21 in its lower face. The groove 21 is generally in the shape of a figure 8 or in the shape of two overlapping circles or ovals, only the external lines of which are employed. The effect of this configuration of groove 21 is to provide for guiding rollers 5 alternately towards and away from the axis of the cam means 2.

The line guiding arm 7 has actually the configuration of an A constituted by arms 22 and 23 connected through the intermediary of a transverse arm 24. Only one of these arms 22 or 23 are used for guiding the line 8, but there will have to be two such arms in order to be able to wind out a line on the bobbin or spool 9 when this is rotating as shown in the drawing clockwise as well as when it rotates anti-clockwise.

The arms 22 and 23 are channeled members on which are accommodated a plurality of rollers 25 arranged in two groups, disposed respectively at the upper and lower extremities of arms 22 and 23; line 8 passes through the grooves of rollers 25 on alternate sides of these groups.

Assuming that the frame 3 and the cam means 2 rotate at different speeds, one may consider, for purposes of understanding the operation of the structure, that the frame 3 is standing still while the cam means 2 rotates relatively thereto at a speed which is equal to the difference of speeds of rotation of these two elements. This being the case, rollers 5 will be alternately urged towards and away from the axis of cam means 2 and arms 4 will pivot about their pivotal connections 26 and 27 to frame 3. Line guiding device 7 is rotatably journalled in cam means 2 by means of shaft 28, and inasmuch as rollers 5 are being urged inwardly and outwardly relative to the axis of cam means 2, arms 22 and 23 will be caused to sweep back and forth across the spool 9 in a manner so as to lay the line 8 in adjacent coils on this spool. This action results from the fact that the axis of rotation of the laying device 7 as well as of the remainder of the apparatus is perpendicularly disposed with respect to the axis defined by the shaft 29 supporting said spool.

From what has been stated above, it will be seen that according to the invention there is provided a simple and efficient line laying device which permits the winding of line on a spool which is being rotated.

There will now be obvious to those skilled in the art many modifications and variations of the structure set forth. These modifications and variations will not, however, depart from the spirit of the invention as defined in the following claim.

I claim:

A device for winding line on a spool comprising rotatable frame means for supporting the spool and defining an axis of rotation, a cam supported by said means and rotatable about said axis, and an arm structure journalled in the cam for oscillation on said axis, said arm structure being engaged with said cam and being controlled thereby to sweep back and forth across said spool, said arm structure extending in opposite directions symmetrically away from said axis in balanced arrangement whereby the device operates independently of centrifugal forces due to the position of said arm structure and whereby the device can operate at increased rotational speeds of said frame means without deleterious results.

References Cited in the file of this patent

UNITED STATES PATENTS

| 35,205 | Abell | May 13, 1862 |
| 373,457 | Hill | Nov. 22, 1887 |
| 481,278 | Hunter et al. | Aug. 23, 1892 |